Figures 1, 2:
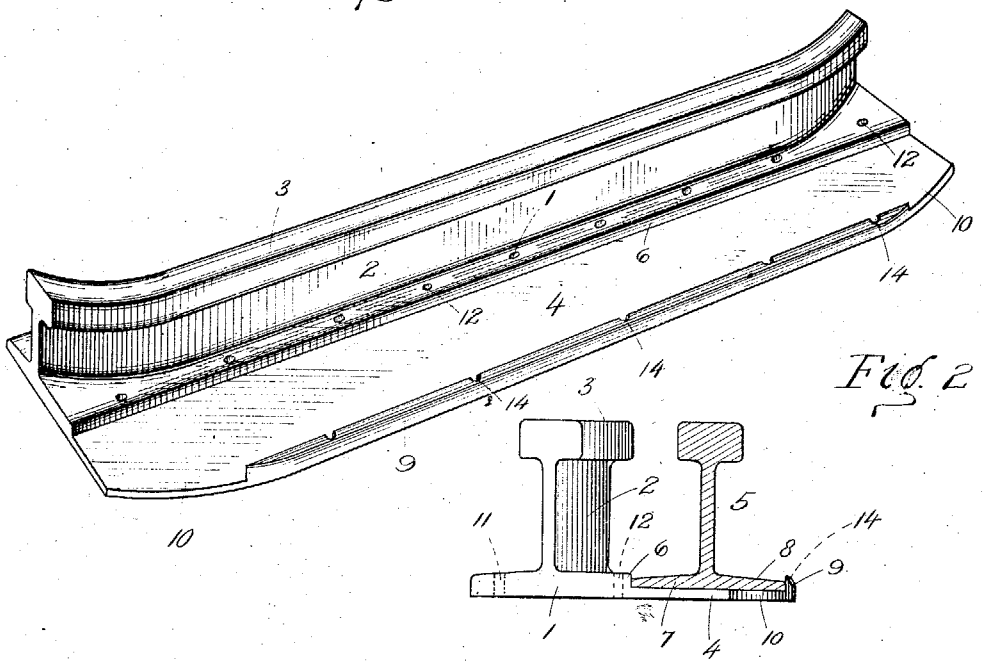

T. CARMICHAEL, DEC'D.

F. B. BRADLEY, ASSIGNEE.

GUARD RAIL.

APPLICATION FILED FEB. 16, 1911.

Reissued Mar. 21, 1911.

13,218

Witnesses

C. E. Burnap

M. G. Johnson

Frank B. Bradley

Engineer & owner assignee of

Thomas Carmichael, Inventor dec'd by Sheridan, Wilkinson, Stott & Richmond Att'ys.

BEST AVAILABLE COPY

UNITED STATES PATENT OFFICE.

THOMAS CARMICHAEL, DECEASED, LATE OF CARNEGIE, PENNSYLVANIA, BY FRANK E. BRADLEY, OF CHICAGO, ILLINOIS, ASSIGNEE BY MESNE ASSIGNMENTS.

GUARD-RAIL.

13,218. Specification of Reissued Letters Patent. Reissued Mar. 21, 1911.

Original No. 837,036, dated November 27, 1906, Serial No. 327,037. Application for reissue filed February 16, 1911. Serial No. 603,981.

*To all whom it may concern:*

Be it known that THOMAS CARMICHAEL, deceased, late a citizen of the United States of America, who resided at Carnegie, in the county of Allegheny and State of Pennsylvania, invented certain new and useful Improvements in Guard-Rails, of which the following is a specification, reference being had therein to the accompanying drawings.

This invention relates to certain new and useful improvements in guard-rails; and the invention has for its object the provision of positive and reliable means in connection with a guard-rail for firmly holding said rail contiguous to a main rail, whereby said guard-rail cannot become displaced should the flange of a wheel impinge the same or should any abnormal pressure be brought to bear upon the guard-rail.

Another object of this invention is to provide a guard-rail which will form a seat for its associate main rail, thereby dispensing with rail-plates where the improved guard-rail is used.

The invention resides in a guard-rail having a base-flange extension adapted to lie under a main rail, forming a seat for said rail, while the main rail prevents the guard-rail from being accidentally displaced.

The detail construction of the improved guard-rail will be presently described, illustrated, and then specifically pointed out in the claims.

Referring to the drawings forming part of this specification, like numerals of reference designate corresponding parts throughout both the views, in which—

Figure 1 is a perspective view of the improved guard-rail; and Fig. 2 is an end view of the same, illustrating a main rail in connection therewith.

The guard-rail comprises a base 1, a web portion 2, and a head or tread 3. The base 1 upon its one side is provided with an extension 4, which is approximately one-half the thickness of the base 1, said base being approximately twice the thickness of an ordinary rail-base, whereby a main rail 5, placed upon the extension 4, will be the same height as the guard-rail. This construction provides a shoulder 6 the entire length of the guard-rail, which is parallel relative to the main rail 5 and serves to brace the rail 5 by the base-flange 7 engaging said shoulder. The opposite base-flange 8 of the rail 5 is braced by a rib or flange 9, carried by the edge of the extension 4, said rib or flange extending almost to the ends of the guard-rail.

The ends of the guard-rail are bent or curved outwardly from the main rail 5, and in order that the rib or flange 9 will not interfere with the main rail 5 the rib at the ends of the extension 4 is removed, as at 10, but the shoulder 6 is maintained parallel to the main rail, whereby said shoulder and the rib 9 will firmly hold the main rail 5.

To secure the guard-rail and main rail to ties or sleepers, is provided the base 1 with spike-openings 11 and 12 and the rib or flange 9 with openings 14, a suitable number of openings being provided to accommodate spikes and insure a positive fastening of the guard-rail to ties.

The novel construction of the improved guard-rail provides a main-rail seat which will prevent the rails moving or becoming displaced with relation to one another.

The invention is not confined to the length, size, or minor details of construction, as such changes in the construction as are permissible by the appended claims may be resorted to without departing from the spirit and scope of the invention.

Claims.

1. A guard-rail comprising a base, a web, and a tread, and a lateral extension carried by the base and extending the length of the latter and being of less thickness than said base, forming a longitudinal shoulder at one marginal edge of said base, and an upwardly extending flange at the outer end of said extension, substantially as described.

2. A guard-rail comprising a base, a web, and a tread, and an extension projecting laterally from the base and being of less thickness than said base whereby a longitudinal shoulder is formed along one marginal edge of the base, and a marginal flange at the outer edge of said base, the said flange being notched in its upper edge, as and for the purpose described.

3. A guard-rail comprising a base, a web and a tread, the base having a plurality of apertures therethrough, and an extension projecting from one edge of said base and being of less thickness than the base whereby to form a longitudinal shoulder adjacent said apertures, the extension adapted to receive a main rail, and said openings adapted to receive spikes securing both the main rail and the guard-rail to cross-ties.

4. A one-piece guard-rail comprising a base, a web, and a tread, and a main-rail-receiving extension projecting laterally from the base and being of less thickness than the base, and a marginal flange on the outer edge of said extension, substantially as shown and described.

5. A full section traffic rail, ties, a guard rail structure comprising an integral base plate and a guard wall flaring from said traffic rail at its ends, said guard rail structure extending outwardly over and between the ties beneath the web of the traffic rail and being free from engagement with said traffic rail above the base flanges thereof.

6. A full section traffic rail, ties, a guard rail structure comprising an integral base plate and a guard wall flaring from said traffic rail at its ends, said guard rail structure extending outwardly over the ties beyond the base of the traffic rail and extending beneath the traffic rail between the ties, but being free from engagement with said traffic rail above the base flanges thereof.

7. A full section traffic rail, ties, a guard rail structure comprising an integral base plate and a guard wall flaring from said traffic rail at its ends, said guard rail structure extending outwardly over and between the ties beyond the base of the traffic rail, and being free from engagement with said traffic rail above the base flanges thereof.

8. A full section traffic rail, ties, a guard rail structure comprising an integral base plate and a guard wall flaring from said traffic rail at its ends, said guard rail structure extending outwardly over the ties beyond the base of the traffic rail and extending beneath the traffic rail between the ties, but being free from engagement with said traffic rail above the base flanges thereof, and means securing the outer edge of the base flange of the traffic rail and the projecting part of said base plate to the ties.

9. A full section traffic rail, ties, a guard rail structure comprising an integral base plate and a guard wall flaring from said traffic rail at its ends, said guard rail structure extending outwardly over and between the ties beyond the base of the traffic rail and being free from engagement with said traffic rail above the base flanges thereof, and means securing the outer edge of the base of the traffic rail and the projecting part of the base plate to the ties.

10. A full section traffic rail, ties, a guard rail structure comprising an integral base plate and a guard wall flaring from said traffic rail at its ends, said guard rail structure throughout its length extending under the base of the traffic rail beneath the web thereof, and being free from engagement with said traffic rail above its base flanges.

FRANK B. BRADLEY,
*Assignee, by mesne assignments, of Thomas Carmichael, deceased.*

Witnesses:
W. E. SCHOENBORN,
WALTER A. SCOTT.